(12) United States Patent
Van Herpen et al.

(10) Patent No.: US 8,475,026 B2
(45) Date of Patent: *Jul. 2, 2013

(54) LIGHT EMITTING TUFTED CARPET

(75) Inventors: Maarten Marinus Johannes Wilhelmus Van Herpen, Eindhoven (NL); Marcellinus Petrus Carolus Michael Krijn, Eindhoven (NL)

(73) Assignee: Koninklijke Philips Elecronics N.V., Eindhoven (NL)

( * ) Notice: Subject to any disclaimer, the term of this patent is extended or adjusted under 35 U.S.C. 154(b) by 373 days.

This patent is subject to a terminal disclaimer.

(21) Appl. No.: 12/743,865

(22) PCT Filed: Nov. 14, 2008

(86) PCT No.: PCT/IB2008/054780
§ 371 (c)(1),
(2), (4) Date: May 20, 2010

(87) PCT Pub. No.: WO2009/066216
PCT Pub. Date: May 28, 2009

(65) Prior Publication Data
US 2010/0309666 A1    Dec. 9, 2010

(30) Foreign Application Priority Data

Nov. 23, 2007 (EP) .................................... 07121400
Mar. 4, 2008 (EP) .................................... 08152239
Jul. 3, 2008 (EP) .................................... 08159617

(51) Int. Cl.
*F21V 8/00* (2006.01)
*G02B 6/42* (2006.01)
*F21S 8/00* (2006.01)

(52) U.S. Cl.
USPC ............................ 362/559; 362/153; 362/576

(58) Field of Classification Search
USPC .................. 362/153, 559, 565, 576, 610, 616
See application file for complete search history.

(56) References Cited

U.S. PATENT DOCUMENTS

| | | | |
|---|---|---|---|
| 4,234,907 A | 11/1980 | Daniel | |
| 4,737,764 A | 4/1988 | Harrison | |
| 4,752,114 A * | 6/1988 | French | 362/559 |
| 4,754,372 A * | 6/1988 | Harrison | 362/565 |
| 4,761,047 A | 8/1988 | Mori | |

(Continued)

FOREIGN PATENT DOCUMENTS

| | | |
|---|---|---|
| DE | 4228570 A1 | 3/1994 |
| DE | 29825103 U1 | 10/2004 |

(Continued)

OTHER PUBLICATIONS

CRC Handbook of Chemistry and Physics, 69th Edition (1988-1989), Robert C. Weast, Editor in Chief, CRC Press, Inc., pp. 4-208, E-406.

*Primary Examiner* — Alan Cariaso

(57) ABSTRACT

The invention provides amongst others a light emitting tufted carpet with a primary backing layer permeable to light, an optional adhesive layer, a waveguide comprising a light out-coupling site, and an optional secondary backing layer. The primary backing layer is provided with tufts. The waveguide is arranged to couple light source light of a light source in as waveguide light, and arranged to couple waveguide light out at the waveguide light out-coupling site to provide carpet light. The waveguide light out-coupling site is below the primary backing layer.

13 Claims, 5 Drawing Sheets

U.S. PATENT DOCUMENTS

| | | | |
|---|---|---|---|
| 5,005,108 A * | 4/1991 | Pristash et al. | 362/602 |
| 6,203,636 B1 | 3/2001 | Popper et al. | |
| 6,481,877 B1 | 11/2002 | Bello, Jr. | |
| 7,300,689 B2 * | 11/2007 | Prevost | 362/559 |
| 7,466,896 B2 * | 12/2008 | Tao et al. | 362/556 |
| 8,215,788 B2 * | 7/2012 | Van Herpen | 362/153 |
| 8,353,602 B2 * | 1/2013 | Van Herpen et al. | 362/153 |
| 2006/0082987 A1 | 4/2006 | Dorsey et al. | |
| 2007/0037462 A1 | 2/2007 | Allen et al. | |

FOREIGN PATENT DOCUMENTS

| | | |
|---|---|---|
| DE | 202006015357 U1 | 1/2007 |
| DE | 102005036533 A1 | 2/2007 |
| DE | 102006012606 A1 | 11/2007 |
| EP | 0155157 A2 | 9/1985 |
| EP | 0261811 A2 | 3/1988 |
| EP | 0323682 A1 | 7/1989 |
| EP | 1193340 A2 | 4/2002 |
| EP | 1306477 A1 | 5/2003 |
| FR | 2592963 A1 | 7/1987 |
| JP | 1079702 A | 3/1989 |
| JP | 08288053 A | 11/1996 |
| JP | 2003210308 A | 7/2003 |
| KR | 2002086396 A | 11/2002 |
| WO | 2006057531 A1 | 6/2006 |
| WO | 2006098799 A2 | 9/2006 |
| WO | 2006129272 A2 | 12/2006 |
| WO | 2007033980 A2 | 3/2007 |
| WO | 2009066215 A1 | 5/2009 |
| WO | 2009066224 A1 | 5/2009 |
| WO | 2009066226 A1 | 5/2009 |
| WO | 2009066228 A1 | 5/2009 |

* cited by examiner

ID OF THE INVENTION

The present invention relates to textile materials having also a light emitting function. The invention especially relates to a carpet comprising a primary backing layer, yarns forming tufts on a carpet side of the primary backing layer, a secondary backing layer, and an adhesive layer arranged between the primary and secondary backing layers. The present invention also relates to a method for the production of such carpet.

BACKGROUND OF THE INVENTION

Carpets generally comprise a primary backing layer provided with yarns forming tufts (on its side facing the user during its use as carpet), a secondary backing layer, and in general an adhesive layer provided between the primary backing layer and the secondary backing layer. The yarns penetrate the primary backing layer to form tufts projecting from the pile surface on which people can walk, etc. The yarns are normally loose and need to be adhered with adhesive (from an adhesive layer). The adhesive layer which may be present on the backside of the primary backing adheres the tufts to the primary backing layer and holds the tufts in place, as well as adhering the primary backing layer and the secondary backing layer. The latter may also be achieved with a second adhesive layer on top of the first adhesive layer.

Textiles comprising optical fibres are known in the art. US2007/0037462 for instance describes a method for manufacturing a distributed optical fibres scrim comprising functional optical fibres, the functional optical fibres scrim thus manufactured, and composites in which an optical fibres scrim is incorporated. This document describes a variety of textile scrims, particularly adhesively bonded non-woven scrim materials, each comprising at least one optical fibre with a continuous path across at least the length or width of the fabric. Such optical fibres scrims may be useful as sensor components (for example, as a detector of breakage, strain, pressure, or torque), as illumination components (for example, in a variety of light-providing applications), or as data-distribution components, either alone or in combination with other materials, such as fabrics, films, foams, and the like.

Further, U.S. Pat. No. 4,234,907 for instance describes a light emitting fabric in which optical fibres are part of the weave, replacing some of the threaded fibres, whereby the fabric is uniformly illuminated and, accordingly, decorated. The individual optical fibres are gathered into a bundle at one end of the fabric and illuminated by a light source. Light travelling through the fibres is emitted in small amounts throughout the lengths thereof through small scratches that pierce the outer coating. Uniformity and intensity of light are enhanced by providing a reflective coating on the non-illuminated ends of the optical fibres. This fabric is usable in clothing; such as costumes, high visibility safety clothing, suntan suits; rugs, draperies, theatre curtains, architectural panels, fibreglass boat hulls, and the like.

SUMMARY OF THE INVENTION

A disadvantage of prior art systems is that production thereof may be relatively difficult. Further, assuming a carpet, a problem may be that such fibre-optic carpets need to be hand sewn, making them expensive. Additionally, the optical fibres may relatively easy be damaged by users, because the optical fibres are sticking out of the carpet, along with the tufts.

Another problem may be that the number of light spots in a fibre-optic carpet is limited by the maximum number of optical fibres that can be connected to the carpet. A further problem, related to LEDs in carpet, may be how to distribute the light from high-power LEDs over a larger area.

Hence, it is an aspect of the invention to provide an alternative carpet, which preferably further (partly) obviates one or more of above-described drawbacks.

Therefore, the invention provides in an embodiment a light emitting tufted carpet having a carpet top layer and a carpet bottom layer, the light emitting tufted carpet comprising a primary backing layer permeable to light, an optional adhesive layer, a waveguide comprising a light out-coupling site, and an optional secondary backing layer, wherein the primary backing layer has a primary backing layer carpet face being the carpet top layer and a primary backing layer bottom face, wherein the primary backing layer is provided with tufts at the primary backing carpet face, wherein the optional secondary backing layer has a secondary backing layer top face and a secondary backing layer bottom face, wherein the light out-coupling site is arranged between the primary backing layer bottom face and the carpet bottom layer, and wherein the waveguide is arranged to couple light source light of a light source in as waveguide light, and wherein the waveguide is arranged to couple waveguide light out at the waveguide light out-coupling site to provide carpet light.

Note that the terms "bottom" and "top" are only used to elucidate in a clear way the different faces of objects such as of the primary backing layer, the adhesive layer (see below), the secondary backing layer and the laminate. The use of the terms "bottom" and "top" does not limit the carpet of the invention as claimed, neither its use, to the configurations schematically depicted in the accompanying drawings.

Especially such carpet may allow a relatively easy production. It further may allow a relatively homogeneous carpet lighting, i.e. the presence of discrete light spots in the carpet may, if desired, be substantially be reduced in relation to light fibre woven carpets. Further, the carpet of the invention may relatively easy be bendable and transportable without damage of the illumination parts such as the optional light source (when integrated within the carpet) and the waveguide(s). In addition, without substantially damaging the illumination parts, users may walk, sit, etc. on the carpet, since the illumination parts may substantially be protected by at least the primary backing layer and in some embodiments at least part, or in other embodiments the entire, secondary backing layer. Further, the carpet according to embodiments of the invention may substantially be open to air, moisture, and even water, which may improve aspects like hygiene. This openness is also advantageous during processing, because the adhesive of the optional adhesive layer may dry easier. Advantageously, the carpet light is generated below the surface of the carpet, more precisely, below the primary backing layer, waveguide light is coupled out from the waveguide at the waveguide light out-coupling site(s) (also herein indicated as "light out-coupling sites" or "out-coupling sites"), thereby allowing protection of the waveguides and allowing a substantial homogenous lighting. as "pile surface") and a primary backing layer bottom face; the optional secondary backing layer has a secondary backing layer top face and a secondary backing layer bottom face.

According to a further aspect, the invention provides a method for the production of the light emitting tufted carpet, wherein the carpet comprises the primary backing, the adhesive layer, a plurality of waveguides, and the secondary backing layer, the method comprising providing an adhesive and the plurality of waveguides to the primary backing layer bottom face or the secondary backing layer top face, and laminating the primary backing layer and the secondary backing layer to each other.

The term carpet herein refers to tufted carpets, but in an embodiment also to tufted rugs and in another embodiment also to tufted goblins. In yet another embodiment, the term carpet refers to tufted car mats. Examples are also tufted carpets that are used as wall or roof covering, or tufted bath mats. Herein, the light emitting tufted carpet is further also indicated as "carpet" or "tufted carpet".

The term "light emitting tufted carpet" refers to carpets according to the invention that allow emission of light when light source light of the optional light source is coupled into the waveguide, and thus light escapes from the waveguides to the exterior through the primary backing layer. However, the accompanying claims do not only relate to carpets during use as light emitter, but also to the carpets per se or to the carpets with the light source while switched off or disconnected form the carpet.

Laminate

The primary backing layer and secondary backing layer may be laminated to each other by means known in the art. Therefore, the carpet may be a laminate, herein also indicated as "carpet laminate" or simply "laminate".

Preferably, an adhesive layer is applied to attach the primary layer and secondary layer to each other. Hence, in an embodiment, the light emitting tufted carpet further comprises an adhesive layer having an adhesive layer top face and an adhesive layer bottom face, arranged between the primary backing layer and the secondary backing layer, wherein the adhesive layer is preferably at least partially permeable for the carpet light. Therefore, the invention provides an embodiment of the light emitting tufted carpet comprising a laminate, wherein the laminate comprises the primary backing layer, the adhesive layer, the waveguide, and the secondary backing layer.

Hence, in this embodiment, at least part of the primary backing layer bottom face of the primary backing layer is in contact with at least part of the adhesive layer top face of the adhesive layer, and at least part of the adhesive layer bottom face (opposite of the adhesive layer top face) of the adhesive layer is in contact with at least part of the secondary backing layer top face. In this way, the laminate is provided, here being a "stack" of the primary backing layer, the adhesive layer and the secondary backing layer.

The laminate has a top layer ("carpet top layer"), which is the primary backing layer carpet face. This layer comprises the tufts. Further the laminate has a carpet bottom layer. This carpet bottom layer may in an embodiment be the secondary backing layer bottom face.

In one embodiment, the carpet does not comprise a secondary backing at all, but only a primary backing layer is provided, with the waveguide behind it (and optionally adhesive between the primary backing layer and the waveguide). The waveguide may comprise a waveguide top layer, directed to the primary backing bottom layer, and a waveguide bottom layer. Hence, in a specific embodiment, the waveguide bottom layer is the carpet bottom layer. Therefore, in a specific embodiment, the laminate of the light emitting tufted carpet comprises the primary backing layer, an adhesive layer and the waveguide. In such embodiment, the area of the laminate may be substantially equal to the area of the primary backing layer (and of the carpet itself). Therefore, the invention provides an embodiment of the light emitting tufted carpet comprising a laminate, wherein the laminate comprises the primary backing layer, the adhesive layer, and the waveguide.

Since optionally no adhesive layer is applied, but the primary backing layer and the waveguide are attached to each other with other means known in the art, the invention provides also an embodiment of the light emitting tufted carpet comprising a laminate, wherein the laminate comprises the primary backing layer and the waveguide and optionally also the secondary backing layer.

However, the laminate may further optionally comprise more layers than the above indicated primary backing layer, optional adhesive layer, and optional secondary backing layer. Such optional layer(s) may be arranged between the primary backing layer and the adhesive layer, between the primary backing layer and the secondary backing layer (in embodiments wherein the adhesive layer is not present), between the adhesive layer, secondary backing layer or below the secondary backing layer, between the waveguide and the secondary backing layer (if present) and between the waveguide and the carpet bottom layer, etc. Examples of such additional optional layer may be the below indicated scattering layer and reflective layer. More than one optional further layer may be present in the carpet laminate.

Primary Backing Layer and Secondary Backing Layer

The term "primary backing layer" may include a primary backing layer comprising a plurality of layers. Likewise, the term "secondary backing layer" may include a secondary backing layer comprising a plurality of layers.

Especially, the yarns forming tufts of the carpet form a structure having enough openings to transmit light, even though the carpet appears to be opaque to human eyes. For appearance reason, the tufts are preferably provided in such a way that the primary backing layer is substantially not visible, but the light can still penetrate through the tuft structure. Placing a source of light under a primary backing layer which is permeable to light results in that the light from the source of light is emitted from the tufted surface.

Such a tufted carpet has the advantage that it has less size restriction of the light emitting part. For instance, at the location of the light emission, the primary backing has not to be removed.

According to a further embodiment of the invention, the primary backing layer is permeable to light. As used in this description, the terms 'permeable to light' or 'light permeable' mean that all or part of the visible light is permitted to pass through the material, with or without being diffused. This has the advantage that the decrease of the intensity of the light emitted from the light source(s) by the primary backing layer is reduced. For example, more than 5%, or more than 10%, or more than 30% of light intensity coupled out of the waveguide may be transmitted through the primary backing layer (see also below).

The term "part of the visible light is permitted to pass" may indicate that all visible light is partly transmitted (i.e. less than 100% is transmitted) but may alternatively or additionally also indicate that some parts of the visible light spectrum is (partly) transmitted and other parts are substantially not transmitted. Layers, especially the adhesive layer (if permeable to light) may be more permeable to some parts of the visible spectrum than to other parts of the visible spectrum, as is known to the person skilled in the art.

According to a further embodiment of the invention, the primary backing layer has apertures which are covered by the tufts. The apertures may increase the intensity of the emitted ("transmitted") light. The freedom of the choice of material for the primary backing layer is now high, because there is no restriction that the primary backing layer material has to be permeable to light. For example a woven textile may be used as primary backing layer. This will have apertures between the yarns in the woven structure.

As used in this description, the term 'secondary backing layer' includes the backing layer which forms the surface of the carpet opposite from the pile surface. Such a layer is usually referred as a 'secondary backing layer' and is commercially available.

These 'secondary backing layers' have an advantage in that they are well-suited for carpet backing and fit in well with the carpet manufacturing method used in carpet factories. Advantages of using the secondary backing layer may be protection of the waveguide(s), and the optional light source(s) as well as providing strength to the carpet. Hence, preferably the tufted carpet according to the invention comprises the secondary backing layer. The invention is however not restricted to the presence of the secondary backing layer, but further and/or other layers may be present, such as on the side of the secondary backing layer facing away from the adhesive layer (i.e. between the secondary backing layer bottom face and the carpet bottom layer), but also elsewhere (see also above).

According to a further embodiment of the invention, at least one of the primary backing layer and the secondary backing layer comprise polypropylene, nylon or jute. These materials have the advantage that they are of relatively low cost. It is easy to manufacture a light permeable structure with polypropylene or nylon. Also, the fact that these materials are commonly used in existing tufted carpets makes the carpet according to the invention easy to manufacture. It is noted that these backing layers may substantially consist of the above materials.

According to a further embodiment of the invention the secondary backing layer has an air permeability of at least about $70\, m^3/min/m^2$. Air permeability of the secondary backing layer can be determined according to ASTM D-737, with a pressure differential equal to 0.5 inch (1.27 cm) water. An acceptable value is $250\, ft^3/min/ft^2$ ($76.2\, m^3/min/m^2$), but more preferred values are in the range of $350$-$800\, ft^3/min/ft^2$ ($106.7$-$243.8\, m^3/min/m^2$). Secondary backing layers with an air permeability of below about $70\, ft^3/min/ft^2$ ($24.4\, m^3/min/m^2$) are considered to be inadequate for high binder cure rates.

According to a further embodiment of the invention, the secondary backing layer has apertures for air passage. Vaporized binders used for the adhesive layer can pass through the apertures during curing of the carpet. With this embodiment, it may be ensured that the air permeability of the secondary backing layer is sufficiently high.

According to a further embodiment of the invention, the carpet has a delamination strength of at least 44.6 kg/m between the primary backing layer and the secondary backing layer. This requirement is sometimes also indicated as "peel strength" and is normally tested according to ASTM D-3936.

According to a further embodiment of the invention, the light source(s), such as LEDs, is (are) integrated in the secondary backing layer, wherein the secondary backing layer is permeable to light for allowing transmission of the light from the light source to the adhesive layer, or the light source is provided on the secondary backing layer top face. These two arrangements of the light source(s) and the secondary backing layer may ensure that the light from the light source reaches the adhesive layer, to be further transmitted to the primary backing layer top face of the carpet. The advantage of this approach is that the light source(s) (are) protected within the laminate structure of the carpet. The light source(s), such as LED(s), but also the waveguide(s), may be protected against e.g. abrasion or impact, which could damage e.g. the electronics or damage a water-tight seal around the electronics. On the pile surface side, the light source(s) are protected by the primary backing with tufts, and on the opposite side the LEDs are protected by the secondary backing. Protection of the backside is especially important during installation of the carpet. Hence, it is thus also advantageous to use the current invention in a light permeable secondary backing of carpet. The reason for this is that for high quality carpet a certain air permeability of the secondary backing is required to achieve high delamination strength. Especially an air permeability of the secondary backing, determined according to ASTM standard D-737, with a pressure differential equal to 0.5 inch water of at least about $250\, ft^3/min/ft^2$ is preferred.

The primary backing layer has a primary backing layer carpet face being the carpet top layer (sometimes also indicated as "pile surface") and a primary backing layer bottom face; the optional secondary backing layer has a secondary backing layer top face and a secondary backing layer bottom face.

The primary backing layer has a primary backing area and the (optional) secondary backing layer has a secondary backing area, which areas are in general substantially the same and in general substantially the same as the carpet area.

Waveguide

As mentioned above, the light out-coupling site is arranged between the primary backing layer bottom face and the carpet bottom layer. Further, as mentioned above, the waveguide may comprise a waveguide top layer, directed to the primary backing bottom layer, and a waveguide bottom layer.

This implies that in an embodiment, the waveguide is arranged between the primary backing layer and the secondary backing layer. In another embodiment, the waveguide is arranged between (part of) the adhesive layer and the primary backing layer. In yet another embodiment, the waveguide is substantially enclosed by the adhesive layer. In a further embodiment, the waveguide is arranged between the adhesive layer and (part of) the secondary backing layer. In yet another embodiment, the waveguide is comprised in the secondary backing layer. In yet another embodiment, the waveguide is comprised between the secondary backing layer and the carpet bottom layer. Combinations of embodiments may also be applied. In again another embodiment, the waveguide is comprised between the adhesive layer and the carpet bottom layer. In yet another embodiment, the laminate comprises the primary backing layer and the waveguide, and the waveguide bottom layer (see also above) is the carpet bottom layer.

In an embodiment, the waveguide is a layer, such as arranged between the primary backing layer and the secondary backing layer, having substantially same area as the primary and secondary backing layer. Preferably however, the waveguide is smaller, and comprises a plurality of waveguides.

Hence, the term waveguide may in an embodiment also include a plurality of waveguides. Therefore, in an embodiment, the light emitting tufted carpet comprises a plurality of waveguides, such as a plurality of light fibres. The term waveguide is known in the art. Another word for waveguide is light guide.

The waveguide comprises a light permeable material such as (a sheet or a strip of) a material selected for example from the group consisting of PET (polyethylene terephthalate), PE (polyethylene), PP (polypropylene), PC (polycarbonate), P(M)MA (poly(methyl)metacrylate), PEN (polyethylene napthalate), PDMS (polydimethylsiloxane), and COC (cyclo olefin copolymer). However, the waveguide may also comprise a silicon rubber as light permeable material. Further, the waveguide may comprise one or more optical fibres. Such optical fibres may have core and a cladding.

The waveguide has a maximum cross-sectional area in a plane substantially parallel to the primary backing layer (and in embodiments wherein the secondary backing layer is present also in general substantially parallel to the secondary backing layer). Preferably, the maximum cross-sectional area of the waveguide is equal to or smaller than about 50% of the primary backing area (or the optional secondary backing area).

However, in a specific embodiment, such as in embodiments of the laminate wherein no secondary backing layer is present, the waveguide may have a cross-sectional area larger than 50% of the primary backing layer, such as in the range of about 50-100%. In a specific embodiment, the waveguide is considered a "backing", and covers substantially the entire area of the primary backing layer (wherein, as mentioned above, between the primary backing layer and the waveguide in an embodiment an adhesive layer is present). In embodiments wherein the secondary backing layer is present and the waveguide has a cross-sectional area larger than 50% of the primary backing layer (and of the secondary backing layer), such as in the range of about 50-100%, preferably an adhesive layer is (also) present between the waveguide and the secondary backing layer. Such embodiment may thus comprise a laminate comprising the primary backing layer, the optional adhesive layer, the waveguide, another optional adhesive layer, and the secondary backing layer.

The plurality of waveguides, vide supra, are preferably arranged in a substantial regular pattern. The term "plurality of waveguides" refers to 2 or more waveguides, especially at least 6 waveguides, or even more, such as at least about 50. Embodiments with 50-150 waveguides are envisaged.

Each waveguide may have a maximum cross-sectional area in a plane substantially parallel to the primary backing layer and the (optional) secondary backing layer. Preferably, the integrated maximum cross-sectional areas of the waveguides is equal to or smaller than about 50% of the primary backing area, such as in the range of about 1-50%, like 2-40%. Especially in this way, substantially homogeneous lighting may be provided on the one hand and openness to air and moisture on the other hand.

In yet another specific embodiment, the adhesive layer is the waveguide; i.e. the adhesive layer further has the function of a waveguide. Especially in such embodiments, the adhesive layer is permeable to light and preferably comprises the light source(s).

As mentioned above, the waveguide is arranged to couple waveguide light out at a waveguide light out-coupling site to provide carpet light. Therefore, the waveguide(s) and the out-coupling(s) are especially arranged to couple waveguide light out as carpet light in the direction of the carpet top layer (or primary backing top layer).

It is known in the art how to couple light out from waveguides. Waveguides are generally based on the principle of total internal reflection. At those places where there is not reflection back into the waveguide, light may couple out. Sites where light escapes from the waveguides are herein indicated as "out-coupling sites" of waveguides. Such out-coupling sites may be created by introducing facets in the waveguide, which lead to reflection beyond the total internal reflection limit, and thus light couples out. Further, terminal ends of waveguides may be used as out-coupling sites. Also depressions (such as scratches) may be created in the waveguide, thereby allowing waveguide light to escape at such depression (as out-coupling site).

Herein, preferably the waveguide light out-coupling sites are thus also between the primary backing layer bottom face and the carpet bottom layer. This may lead to a maximum protection of the optical fibres instead of other solutions, wherein the fibres are also woven, and further allows a homogenous generation of carpet light.

Note that herein the term "directed to" does not necessarily imply "in physical contact with". In an embodiment, "directed to" is "in physical contact with", however, in another embodiment, "directed to" means "facing". For instance, in an embodiment the laminate comprise the secondary backing layer, the waveguide, the adhesive layer (for instance enclosing the waveguide) and the primary backing layer. In such embodiment, the secondary backing layer top face is directed to the waveguide and directed to the primary backing layer, but may be in contact with the former, but is not in contact with the latter (because of the intermediate adhesive layer).

Optical Fibres

Optical fibres in general comprise a core and cladding and may be provided with one or more out-coupling sites by providing for instance one or more cuts (such as scratches) in the cladding. The cladding may be permeable to light.

Alternatively or additionally, luminescent material particles may be integrated in the optical fibre, at each location of the luminescent material particle (particle size in the order of microns to hundreds of microns), light waveguide light is absorbed, and converted, and emitted, and at least part of the emission light may escape from the optical fibre. For instance, the luminescent material may comprise a blue absorbing and yellow emitting material, such as YAG:Ce, or analogues thereof, and the waveguide light may be blue light.

Alternatively or additionally, instead of luminescent material particles, reflective particles may be used, such as $TiO_2$ particles, calcium carbonate particles, etc.

Alternatively or additionally, so called "lossy fibres" may be applied, which comprise for instance optical fibres which couple light substantially out over their entire surface. Hence, in an embodiment, the waveguide, especially the optical fibre, comprises a plurality of waveguide light out-coupling sites.

Adhesive Layer

The adhesive layer comprises an adhesive layer top face, directed to the primary backing layer and an adhesive layer bottom face directed to the secondary backing layer.

Again, the term "adhesive layer" may in an embodiment include an adhesive layer comprising a plurality of adhesive layers (such as a pre-coat layer and adhesive layer) and may in another embodiment include an adhesive layer comprising a plurality (such as a mixture) of adhesives. For instance, the adhesive layer may be present on the backside of the primary backing and adhering the tufts to the primary backing layer and holding the tufts in place as well as adhering the primary backing layer and the secondary backing layer to each other (with for instance the waveguide(s) within the adhesive layer). Or a first adhesive layer may be present on the backside of the primary backing and adheres the tufts to the primary backing layer and holds the tufts in place, and a second adhesive layer, on top of the first adhesive layer, for adhering the primary backing layer and the secondary backing layer (with for instance the waveguide(s) within the second adhesive layer). Such adhesive layers, though optionally also being based on different adhesives, are herein indicated as adhesive layer.

Especially in those embodiments wherein the waveguide is at least partially arranged in the adhesive layer, and even more especially in those embodiments wherein the waveguide is not in physical contact with the primary backing layer, but is at least partially covered by the adhesive layer, it is preferred that the adhesive layer is permeable for carpet light, i.e. (the light escaping from the optical fibre to the exterior of the carpet). Hence, in an embodiment, the adhesive layer 50 is permeable for carpet light.

Therefore, the adhesive layer holding the tufts in place may in an embodiment be used to hold the light source in place under the primary backing layer. The light source may be positioned between the primary backing layer bottom face of the primary backing layer and the adhesive layer top face of the adhesive layer. Opening(s) may be provided in the surface of the adhesive layer top face directed to the primary backing layer, in which the light source can be placed.

According to a preferred embodiment of the invention, the adhesive layer is at least partially permeable to light for allowing transmission of the light from the light source to the primary backing layer. This allows that the light source may be arranged on the adhesive layer bottom face. In this case, the light source may optionally be fixed in place with an additional adhesive means. The light source may also be fully encapsulated in the adhesive layer. Alternatively, the light source may be positioned under the adhesive layer within a space between the light source and the adhesive layer.

In a further embodiment, the adhesive layer further comprises scattering particles, such as $TiO_2$ or calcium carbonate particles. Such particles may improve light out-coupling and/or an homogeneous light distribution/out-coupling over the carpet. Hence, such particles are arranged to scatter part of the carpet light in the adhesive layer.

According to a further embodiment of the invention, the adhesive layer comprises electrically conductive particles. The electrically conductive particles may give the carpet anti-static properties. The electrically conductive particles may be e.g. carbon black, potassium formate (HCOOK), tin-oxide, indium-tin-oxide or silver.

According to a further embodiment of the invention, the adhesive layer comprises anti-oxidants. The anti-oxidants make the adhesive layer more resistant to heat. This is advantageous because light source(s) such as LEDs can generate a substantial amount of heat. Also, latex without anti-oxidants may age faster and become yellow after some time, due to which it starts to absorb light, such as possibly the waveguide light.

According to a further embodiment of the invention, the adhesive layer comprises latex. The latex may be light permeable latex. It is noted that the adhesive layer may substantially consist of latex. The latex may be based on terpolymers of styrene, butadiene and an acidic vinyl monomer. When the adhesive layer substantially consists of light permeable latex and comprise substantially no light scattering particles, the light from the light source(s) can leave the carpet efficiently. Thus, preferably no light scattering fillers are used in the adhesive and the adhesive layer is light permeable. Therefore, in an embodiment, the adhesive layer is free from light scattering particles. The phrase "is free from . . . " and similar phrase or terms especially indicate that something "is substantially free from . . . ".

According to a further embodiment of the invention, the adhesive layer comprises acrylics. The acrylics may be light permeable acrylics. It is noted that the adhesive layer may substantially consist of acrylics. An example of acrylics is polyacrylate ester. Advantages of acrylics are hardness, flexibility and resistance against UV. Acrylics are also highly resistant to heat, which makes it an especially suitable material for use in combination with light source(s) such as LEDs, which generate a relatively large amount of heat. Latex and acrylics may also be used in combination.

In a preferred embodiment a polyolefin dispersion is used as pre-coat (on for instance the primary layer for subsequent providing the adhesive layer) and/or the adhesive layer itself. A suitable polyolefin dispersion may for instance be HYPOD™ of Dow Chemical. These are propylene- and ethylene-based dispersions that combine the performance of high-molecular-weight thermoplastics and elastomers with the application advantages of a high-solids waterborne dispersion. Polyolefin dispersions can provide benefits to carpet manufacturers by allowing them to apply a thermoplastic backing using conventional coating equipment. For example, using a carpet backing of PVB (poly vinyl butyral), or polypropylene, the problem of UV sensitivity is solved, while at the same time increasing the UV-light permeability. Hence, another suitable polyolefin dispersion may be a pvb-based dispersion. However, other thermoplastics might have an even higher UV-light permeability.

As mentioned above, in yet another specific embodiment, the adhesive layer is arranged to be the waveguide; i.e. the adhesive layer further has the function of a waveguide. Especially in such embodiments, the adhesive layer is permeable to light and preferably comprises the light source(s). In all other embodiments, the waveguide is a separate entity, materially different from the (optional) adhesive layer.

Light Source

The light source may be arranged external from the light emitting tufted carpet and/or internal in the light emitting tufted carpet. Small light sources such as LEDs may be arranged within the carpet (but also external from the carpet), while relatively more bulkier light sources such as halogen lamps, etc., may be arranged external from the carpet. Light of external light sources may be coupled directly into the waveguide, or by an intermediate waveguide, arranged between the light source and the waveguide of the carpet. Hence, in an embodiment, the light source is arranged between the primary backing layer bottom face and the carpet bottom layer.

The term light source may also relate to a plurality of light sources, such as at least 2. In a specific embodiment, the carpet comprises a plurality of light sources, in an embodiment integrated within the carpet and/or in another embodiment external from the carpet. In general, a plurality of light sources may serve a plurality of waveguides. Hence, in a specific embodiment, comprising a plurality of light sources and a plurality of waveguides, the waveguides and the light sources are arranged to couple light source light of the light sources into the waveguides as waveguide light, respectively. However, it is also possible that a plurality of light sources provide light source light to the same waveguide, either at substantially the same place or at a plurality of different places.

The plurality of light sources may generate light with substantially similar spectra, but may also generate light with substantially different spectra. Hence, the plurality of light sources may generate substantially the same colour of light or may generate a plurality of colours.

In a preferred embodiment, the light source comprises one or more LEDs. According to a further embodiment, wherein a plurality of LEDs as light sources is applied, the LEDs are Red-Green-Blue (RGB) LEDs. For example, a portion of the LEDs is red LEDs, another portion is green LEDs and yet another portion is blue LEDs. The use of RGB LEDs is advantageous because it allows the colour of the carpet to be changed. For example when white tufts are used in combination with RGB LEDs, it is possible to change the colour of the carpet into any desired colour. For example, by setting the RGB LEDs to the colour green, the tufts of the carpet will look green.

Herein, the light source is indicated as optional light source. The term "optional" is applied, since the carpet is not necessarily always associated with a light source. The invention is also directed to the carpet per se, independent of the presence of the optional external light source. Further, the invention is in an embodiment directed to a combination of the carpet and the light source, and the invention is directed to an embodiment wherein the light source is integrated in the carpet.

Others

According to a further embodiment of the invention, at least one of the primary backing layer, the secondary backing layer and the adhesive layer comprises light scattering particles, which are also referred as fillers. Fillers have the advantage of reducing the cost of the carpet, while bulking up the adhesive at the same time. Because the fillers scatter light, this results in that the light from the carpet appears to originate from an area larger than the original emission spot. It is advantageous when a homogeneous light emission is desired. The light scattering particles may be calcium carbonate, or other materials, such as $TiO_2$. The advantage of calcium carbonate is that it is of relatively low cost. Calcium carbonate may be in the form of calcite or chalk. The light scattering particles may also be kaolinite such as china clay fillers. Typically the fillers are used in quantities such as for example 600 g/l, but for many embodiments of the current invention it is preferred that much lower amounts are used in order to increase the light permeability.

According to a further embodiment of the invention, the tufted carpet further comprises a reflecting layer positioned to a side of the waveguide facing away from the primary backing layer. The reflecting layer can direct the light from the light waveguide to the pile surface and increase the intensity of the light emitted from the tufted carpet. For instance, a reflective layer may be arranged between the waveguide and the carpet bottom layer. Alternatively, between the secondary backing layer bottom face and the carpet bottom layer a reflective layer may be arranged. Assuming the waveguide being arranged substantially within the adhesive layer, between the adhesive layer and the secondary backing layer, a reflective layer may be arranged. Such reflective layer is not necessarily an integral layer, but may also consists of parts, for instance in view of adhesive properties. The carpet bottom layer may also be a reflective layer itself. Reflection may be specular or diffuse. Hence, the reflective layer may also be a scattering layer.

Hence, the optional adhesive layer, the optional reflective layer or the optional scattering layer may be an integral layer, substantially having the same length and width dimensions as the primary backing layer, but may also consist of parts. For instance, good adhesion between the primary and secondary backing layer may also be achieved wherein there are "layer domains" i.e. parts of the primary and secondary backing layers are adhered to each other by the adhesive layer, and parts are laminated to each other without the adhesive layer in between. The person skilled in the art may optimize the dimensions of the optional adhesive layer, the optional reflective layer or the optional scattering layer in order to obtain the desired results.

The terms "permeable for light", "permeable to light" or "light permeable" relates to the light transmitted by a material, such as a layer. Herein, the term "transmitted" or "transmission" relate to undisturbed transmission (substantially no scattering in the material) and/or disturbed transmission (after scattering, like in translucent materials). Hence, the terms "permeable for light" or "light permeable" may also herein be indicated as "transmission". The transmission or permeability can be determined by providing light at a specific wavelength with a first intensity to the material and relating the intensity of the integrated light at that wavelength measured after transmission through the material, to the first intensity of the light provided at that specific wavelength to the material (see also E-208 and E-406 of the CRC Handbook of Chemistry and Physics, $69^{th}$ edition, 1088-1989). The terms "permeable for light" or "light permeable" indicate that at least 1% of the light is transmitted, more preferably at least 10% of the light, even more preferably at least 30% of the light, by the material or layer. Note that even a low transmission may for this application be allowable, especially when using high-power LEDs. In general, the permeability for light, such as of the primary backing layer, of the secondary backing layer and of the adhesive layer, i.e. is especially determined in relation to visible light travelling in the direction to the carpet top layer.

The waveguide herein, will in general have a high light permeability. In general, the light permeability for the waveguide in the visible will be at least about 80%, more preferably at least about 90%, yet even more preferably at least about 95%. Especially with respect to the waveguide, the transmission can further be defined as the transmission of a 1 cm thick piece of the waveguide material under perpendicular radiation with visible light. The waveguide material may be one of the materials defined above, or in another embodiment, as defined above, the material of the adhesive layer.

The primary backing layer preferably has a light permeability for visible light of at least about 1%, even more preferably at least about 10%, yet even more preferably at least about 30%. Any other downstream material or layer, arranged downstream of the waveguide (i.e. arranged between the waveguide and the primary backing layer bottom face) has preferably a light permeability of at least about 1%, even more preferably at least about 10%, yet even more preferably at least about 30%.

The terms "blue light" or "blue emission" especially relates to light having a wavelength in the range of about 410-490 nm. The term "green light" especially relates to light having a wavelength in the range of about 500-570 nm. The term "red light" especially relates to light having a wavelength in the range of about 590-650 nm. The term "yellow light" especially relates to light having a wavelength in the range of about 560-590 nm.

The term "light" herein, such as in the terms "carpet light" or "light source light" preferably relates to visible light. The term "visible light" especially relates to light having radiation with a wavelength selected from the range of about 400-700 nm.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 1a, 1b, 1c, 1e, 1f and 1g are cross-sectional views (a cross section perpendicular to the carpet assuming a horizontal flat surface), whereas FIGS. 1d and 1h are perspective views;

FIGS. 2a, 2b and 2c are "top" views, wherein for the sake of understanding, the primary backing layer 10 is "removed", to show the light source(s) and waveguide(s)

The figures herein are schematic figures, in general only showing the most essential parts, and leaving away parts that are considered clear to the person skilled in the art. For instance, voltage sources, electric wires, etc. are for the sake of clarity in most of the figures not included. Further, the drawings are not on scale.

DESCRIPTION OF PREFERRED EMBODIMENTS

Figure 1A:
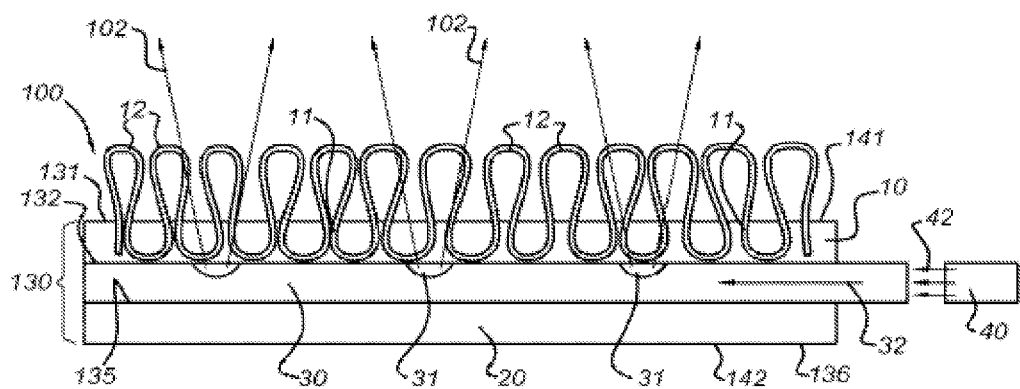
FIGS. 1a-1h schematically depict embodiments of the light emitting tufted carpet according to the invention.

FIG. 1a schematically depicts an embodiment of a light emitting tufted carpet 100 according to the invention. The light emitting tufted carpet 100 (herein also indicated as carpet 100) comprises a laminate 130 of a primary backing layer 10 and a secondary backing layer 20, further a waveguide 30, and a light source 40. The light source 40 may be optional.

Here, the primary backing layer 10 has a primary backing layer carpet face 131 and a primary backing layer bottom face 132. The primary backing layer 10 is provided with yarns 11 forming tufts 12, here closed loop tufts, at the primary backing carpet face 131. The primary backing layer carpet face is herein also indicated as "carpet side", or "side facing the user during its use as carpet". The primary backing layer 10 is being permeable to light, i.e. light from the waveguide (see below), escapes to the exterior of the carpet 100 via the primary backing layer.

The secondary backing layer 20 has a secondary backing layer top face 135 and a secondary backing layer bottom face 136.

The primary backing layer 10 and the secondary backing layer 20 form a laminate 130, which may optionally also comprise further layers, such as an adhesive layer (see below), a reflective layer, etc. The laminate 130 has the primary backing layer carpet face 131 as carpet top layer 141 and has a carpet bottom layer 142, which, in this embodiment is the secondary backing layer bottom face 136.

As mentioned above, note that the terms "bottom" and "top" are only used to elucidate in a clear way the different faces of objects such as of the primary backing layer 10, the adhesive layer (see below), the secondary backing layer 20 and the laminate 130. The use of the terms "bottom" and "top" does not limit the carpet of the invention as claimed, neither its use, to the configurations schematically depicted in the accompanying drawings. Also carpets 100 on a roll are claimed herein.

The waveguide 30 is arranged between the primary backing layer bottom face 132 and the carpet bottom layer 142. Herein, in this embodiment, the waveguide 30 is arranged between the primary backing layer bottom face 132 and the secondary backing layer top face 135.

Further, in this side view, the area of the waveguide 30 is substantially the same as the area of primary backing layer 10 and the secondary backing layer 20. However, preferably this area (or the integrated maximum cross-sectional waveguide area) of the waveguide is smaller than the area of primary backing layer 10 (and the secondary backing layer 20, respectively) (see also below). The term area refers to the "cross-sectional area" or "maximum cross-sectional area", i.e. the area of the waveguide 30, primary backing layer 10 and the secondary backing layer 20 in a plane perpendicular to the plane of drawing in FIGS. 1a (and 1b, 1c and 1e) and parallel to the layers; or, in other words, in a plane parallel to the carpet 100, during a flat application of the carpet 100 (such as on a substantially horizontal floor).

The waveguide 30 is arranged to couple waveguide light (reference 32) out at a (i.e. including one or more) waveguide light out-coupling site 31 as carpet light 102. The waveguide receives light from a light source 40. Hence, the light source 40 is arranged to generate light source light 42. The waveguide 30 and the light source 40 are arranged to couple light source light 42 of the light source 40 into the waveguide 30 as waveguide light 32 (i.e. light travelling through the waveguide 30 as a result of the in-coupling of light source light 42 into the waveguide 30). At the out-coupling site(s) 31, substantially arranged between the primary backing bottom face 132 and the carpet bottom layer 142, light escapes from the waveguide 30. This light is indicated herein as "carpet light 102" and this light travels in the direction to the carpet top layer 141. This light is at least partially transmitted through the primary backing layer 10, and thereby provides this carpet light 102. The waveguide(s) 30, and especially the light out-coupling sites 31, are preferably arranged to couple waveguide light 32 out from the waveguide in the direction of the primary backing layer top side 131.

The primary backing layer 10 is downstream of the light out-coupling sites 31. In other words, the waveguide light out-coupling site 31 is below the primary backing layer 10.

In this embodiment, one external light source 40 and one waveguide 30 are schematically depicted.

The primary backing layer 10 and secondary backing layer 20 may be attached to each other by means known in the art, such as an adhesive layer. Referring to FIG. 1a, an adhesive layer may be arranged between the primary backing layer 10 and the waveguide 30. Optionally, also an adhesive layer may be arranged between the waveguide 30 and the secondary backing 20 (both are not depicted in FIG. 1a). In embodiments wherein the secondary backing layer 20 is present and the waveguide 30 has a cross-sectional area larger than 50% of the primary backing layer 10 (and of the secondary backing layer 20), such as in the range of about 50-100%, preferably an adhesive layer is (also) present between the waveguide 30 and the secondary backing layer 20. Such embodiment may thus comprise laminate 130 comprising the primary backing layer 10, the optional adhesive layer (reference 50, see below), the waveguide 30, another optional adhesive layer, and the secondary backing layer 20.

Figure 1B:
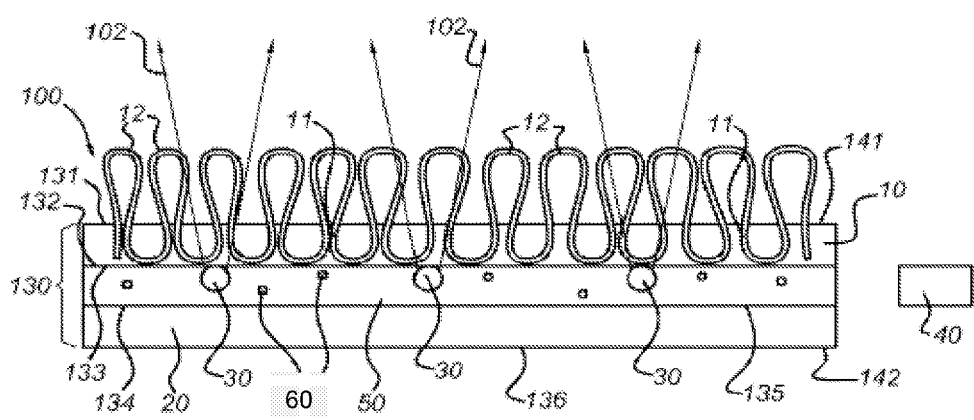

FIG. 1b then schematically depicts substantially the same embodiment as schematically depicted in FIG. 1a. However, in this embodiment, the carpet 100 further comprises an adhesive layer 50 having an adhesive layer top face 133 and an adhesive layer bottom face 134, arranged between the primary backing layer 10 and the secondary backing layer 20. Here, the adhesive layer 50 is substantially in contact with the primary backing layer bottom face 132 and the secondary backing layer top face 135, respectively. The adhesive layer 50 may be present on substantially the entire surface of the primary backing layer 10 and the secondary backing layer 20, but may also arranged in discrete regions on the primary backing layer and the secondary backing layer 20.

In this embodiment, the waveguide 30 is arranged between (part of) the adhesive layer 50 and the primary backing layer 10. In this schematically depicted embodiment, the light emitting tufted carpet 100 comprises a plurality of waveguides 30, such as a plurality of light fibres (herein also indicated as optical fibres).

As mentioned above, the waveguide 30, and especially the light out-coupling sites 31 (not depicted, but see also FIGS. 1a and 3), may be arranged to couple waveguide light 32 out from the waveguide in the direction of the primary backing layer top side 131, but alternatively or in addition, it may occur or be predetermined that part of the waveguide light 32 also escapes in the direction of the adhesive layer 50. Hence, in a preferred embodiment, the adhesive layer 50 is preferably at least partially permeable for the carpet light 102.

The adhesive layer 50 in FIG. 1b is a light permeable adhesive layer 50, which further optionally comprises particles 60, which may comprise one or more type of particles 60 selected from the group consisting of scattering particles, electrically conductive particles, and antioxidants. Especially, those particles 60 may comprise scattering particles. Preferably, the adhesive layer 50 is free from light scattering particles as particles 60. Herein, scattering particles or light scattering particles are particles that do substantially not have the function of electrically conductive particles or antioxidant particles.

In FIG. 1b, the waveguides 30, such as optical fibres, are seen in a schematic front view. The in-coupling of the light source light 42 from light source 40 may for instance occur at the other side of the waveguide 30 at the back side (in this drawing) of the schematically depicted carpet 100.

Figure 1C:
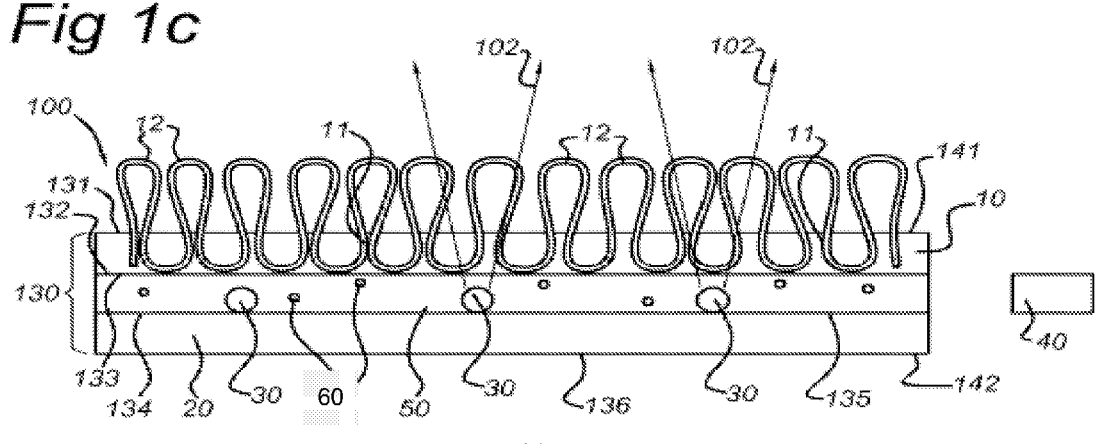

FIG. 1c schematically depicts an embodiment which is substantially identical to the embodiment schematically depicted above in FIG. 1b, but wherein the waveguide 30 is arranged between the adhesive layer 50 and part of the secondary backing layer 20. In this embodiment, the waveguides 30 may be in contact with the secondary backing layer top face 135. Especially in such embodiment, it is desired that the adhesive layer 50 is (also) permeable to the carpet light 102. Hence, light escaping from the waveguides 30 travels through at least part of the adhesive layer 50 in the direction to the carpet top layer 141 and subsequently travels through the primary backing layer 10 (in the direction of the carpet top layer 141) and leaves the carpet 100 to the exterior as carpet light 102.

Figure 1D:
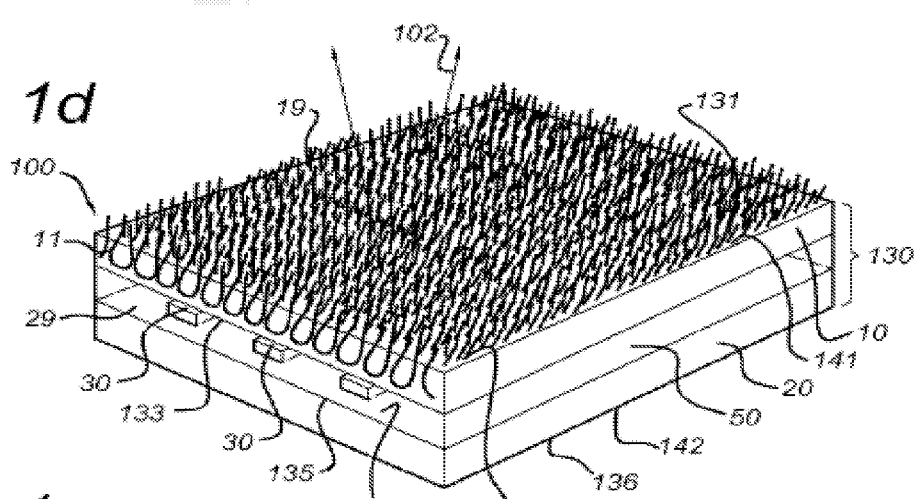

FIG. 1d schematically depicts a perspective view of an embodiment according to the invention, which is substantially identical to the schematically depicted carpets 100 in FIGS. 1b and 1c, with the main exceptions that the tufts 12 are here cut loop tufts, and that the waveguides 30 are substantially enclosed by the adhesive layer 50 (i.e. the waveguide(s) are substantially only in contact with the adhesive of the adhesive layer 50, and substantially not in contact with the primary backing layer 10 or the secondary backing layer 20). Options to couple light source light 42 into the waveguide(s) 30 are further indicated in FIGS. 2a-2c, see below.

As will be clear to a person skilled in the art, the schematic depiction of closed or open loop tufts is not limiting.

Figure 1E:
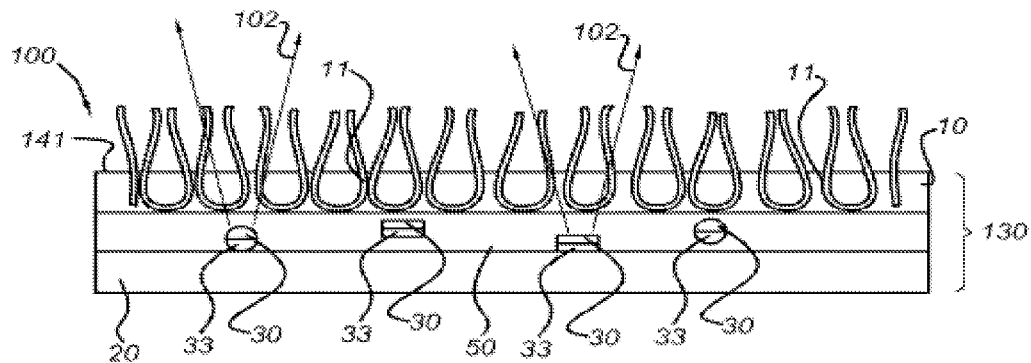

FIG. 1e, in combination with FIG. 1d, is especially shown to illustrate the relation of the waveguide area and the primary or secondary backing layer areas. The schematic drawing of FIG. 1d indicates with references 19 and 29, the areas of the primary backing layer 10 and the secondary backing layer 20, relatively. In general, and at least also in this embodiment, these areas 19 and 29 are substantially the same, and are substantially the same as the area of the carpet 100. These areas 19 and 29 may also be indicated as cross-sectional areas of the primary backing layer 10 and the secondary backing layer 20, respectively, wherein again the term "cross-sectional" refers to a cross section parallel to the plane of the carpet 100 during flat use (i.e. during use on a flat surface, especially on a substantial horizontal surface). FIG. 1e schematically depicts a plurality of waveguides 30, wherein each waveguide 30 has a maximum cross-sectional area 33 in a plane substantially parallel to the primary backing layer 10 and the secondary backing layer 20. The term "maximum cross-sectional area" is applied, since the waveguides 30 may for instance have a substantial round cross-section (in a plane perpendicular to the waveguide 30, such as an optical fibre), wherein the cross-sectional area thus varies.

Hence, referring to FIG. 1e, the area of a waveguide cross section, in a plane parallel to the primary backing layer 10 and the secondary backing layer 20 is taken at the largest width of the waveguides 30, as indicated in FIG. 1e. Preferably, the integrated maximum cross-sectional areas of the waveguides 30 is equal to or smaller than about 50% of the primary backing area 19 (and thus also of the secondary backing layer area 29).

Figure 1F:
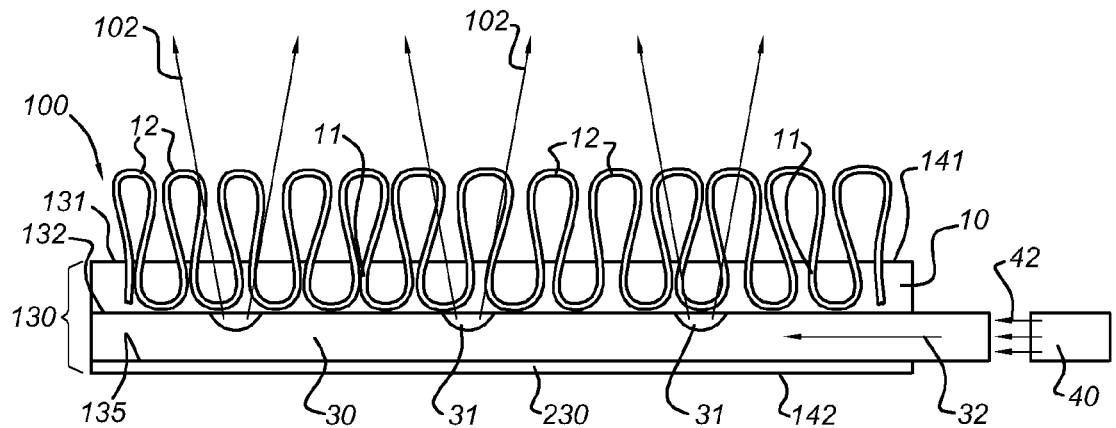

FIG. 1f schematically depicts substantially the same embodiment as FIG. 1a, with the exception that the tufted carpet 100 does not comprise the secondary backing layer 20. Optionally, the laminate 130 of the primary backing layer 10 and the waveguide 30 may further comprise a backing layer 230, which may for instance be a reflective foil (reflective layer). In this schematic drawing, the integrated maximum cross-sectional areas of the waveguides 30 is substantially equal to the primary backing area although this embodiment is not limited to such configuration. Note that between the waveguide(s) 30 and the primary backing layer 10 also optionally the adhesive layer 50 may be present or the waveguide(s) 30 may be integrated within the optionally adhesive layer 50 (see FIGS. 1b and 1c).

Figure 1G:
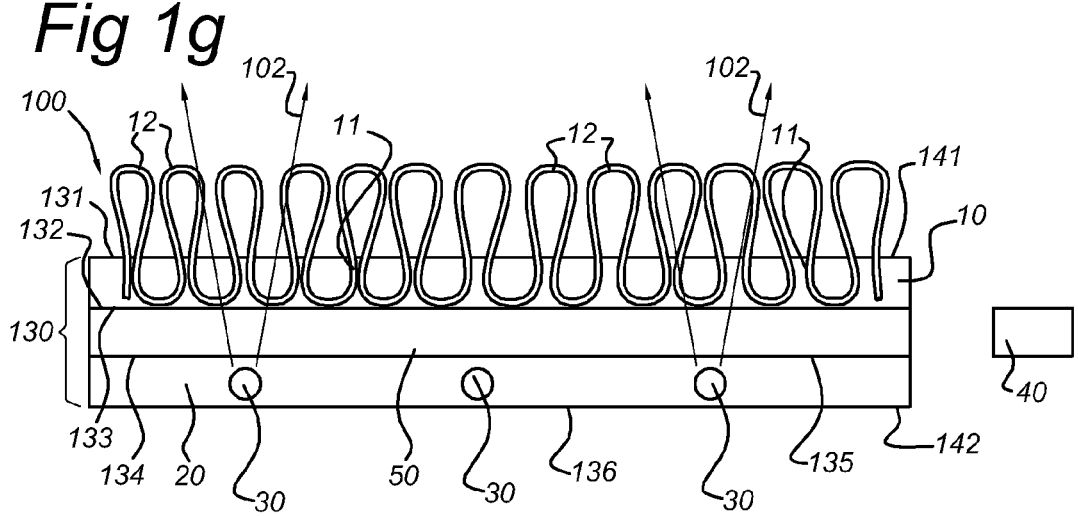

In yet another embodiment, schematically depicted in FIG. 1g, the waveguide(s) are integrated in the secondary backing layer 20. In the embodiment depicted here, the adhesive layer 50 does preferably substantially not comprise scattering particles. Light escaping from the waveguides 30 travels in this embodiment through part of the secondary backing layer 20, through the (optional) adhesive layer 50 and through the primary backing layer 10 in the direction of the carpet top layer 141 and exits the carpet 100 as carpet light 102.

Figure 1H:
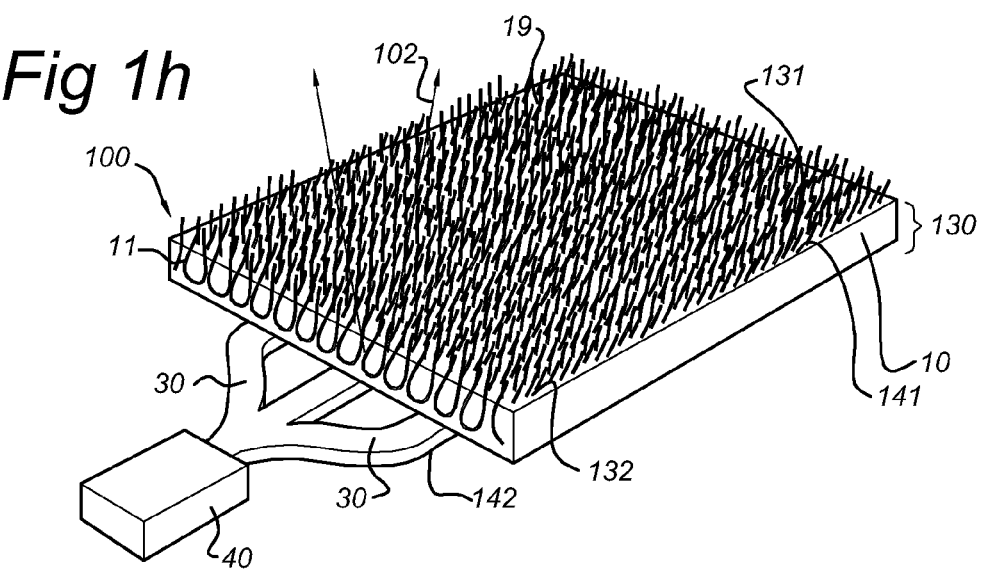

In a variation to the embodiment schematically depicted in FIG. 1d, an embodiment of the carpet 100 is schematically shown in FIG. 1h, wherein the waveguide 30 comprises a plurality of waveguides 30, and no secondary backing 20 is present. The waveguides 30 may in such embodiment provide the carpet bottom layer 142.

Figure 2A:
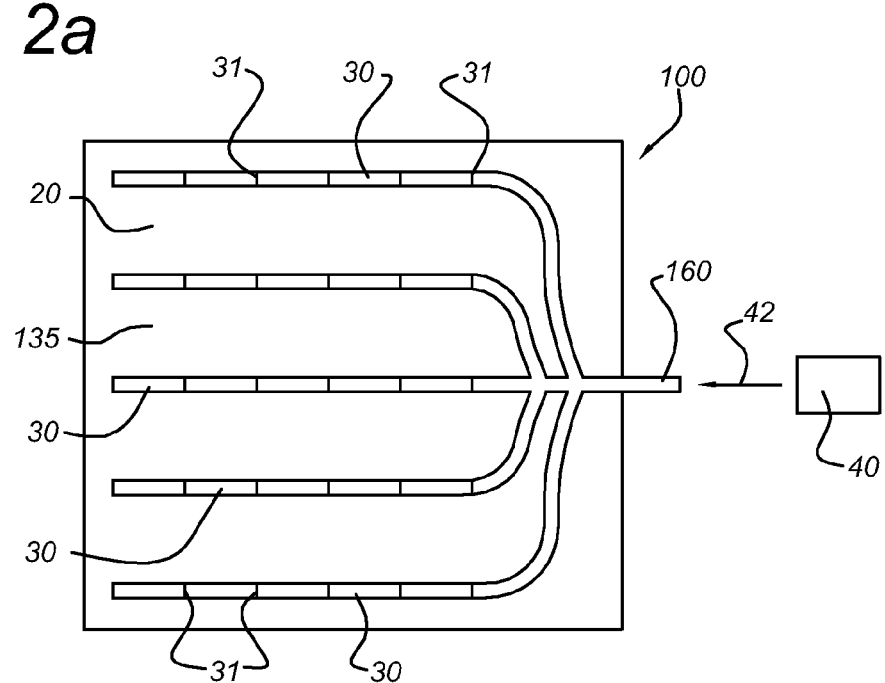
FIGS. 2a-2c schematically depict embodiments of arrangements of the light source(s) and the waveguide(s) according to embodiments of the invention.
Figure 2B:
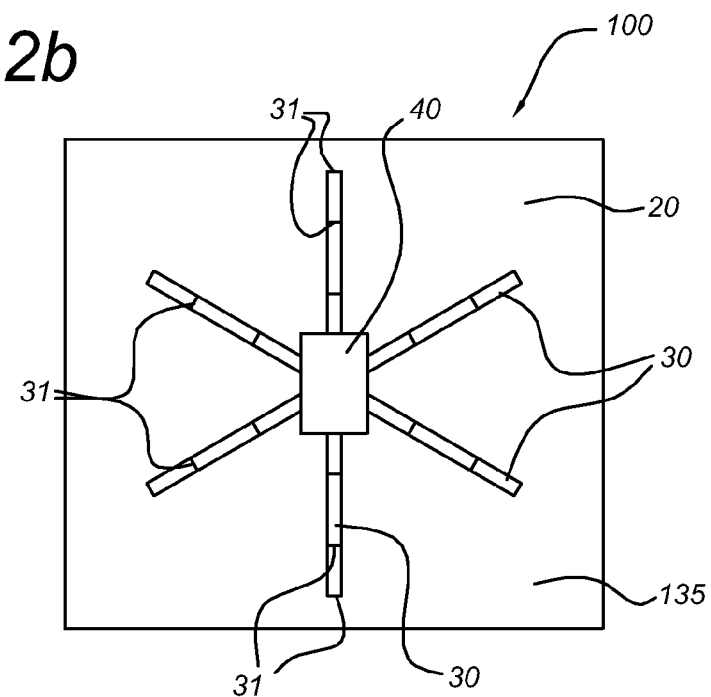
Figure 2C:
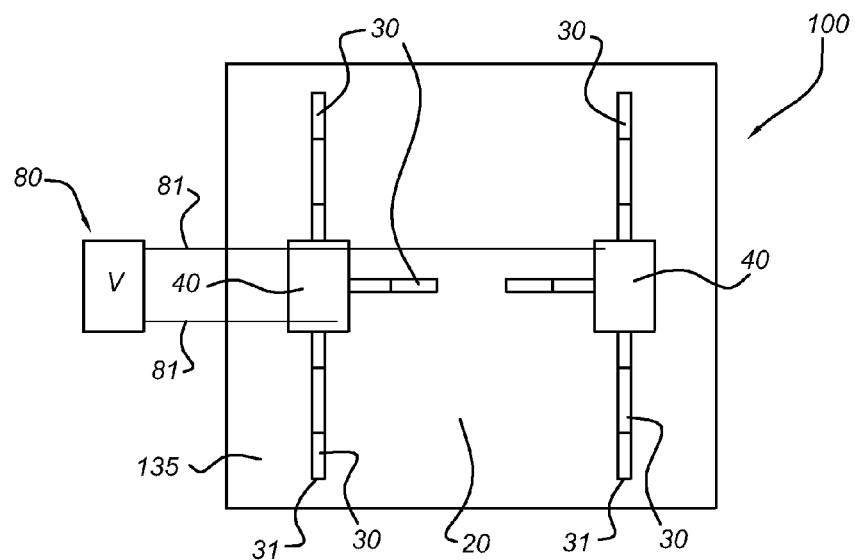

FIGS. 2a-2c schematically depict embodiments of arrangements of the light source(s) 40 and the waveguide(s) 30 according to embodiments of the invention; FIGS. 2a, 2b and 2c are "top" views, wherein for the sake of understanding, the primary backing layer 10 is "removed", to show the light source(s) 40 and waveguide(s) 30.

FIG. 2a schematically depicts an embodiment, wherein the waveguide 30 comprises a plurality of waveguides (here, arranged on the secondary backing layer top face 135). The waveguides 30 comprise pluralities of out-coupling sites 31. The waveguides 30 receive light 42 from the light source 40 via an in-coupling unit 160, which may comprise an intermediate waveguide and/or auxiliary optics. The in-coupling unit 160, which may comprise an intermediate waveguide and/or auxiliary optics, is arranged to couple light source light 42 into the waveguide 30, here a plurality of waveguides 30. The term "intermediate waveguide" is applied to indicate that this waveguide is arranged to guide light from the light source 40 to the waveguide 30 comprises in the carpet 100.

Though the in-coupling unit 160 is not depicted in other schematic drawings, as will be clear to the person skilled in the art, any carpet 100 according to the invention may comprise one or more in-coupling units 160.

Note that advantageously, the waveguide light out-coupling sites 31 are between the primary backing layer bottom face 132 and the carpet bottom layer 142.

FIGS. 1a-1h and 2a schematically depicted embodiments wherein the light source 40 was arranged external from the carpet 100; FIGS. 2b and 2c schematically depict embodiments wherein the light source(s) 40 are arranged between the primary backing bottom layer face 132 and the carpet bottom layer 142. Here, in these schematically depicted embodiments, the light source(s) 40 are arranged between the primary backing bottom layer face 132 and the secondary backing layer top face 135. For instance, the light source(s) may at least partially be integrated in the adhesive layer 50. In the schematic drawings 2b and 2c, for the sake of understanding, the optional adhesive layer 50 and the primary backing layer 10 are not depicted, in order to better see the arrangement of the light source(s) 40 and the waveguide(s) 30.

In FIG. 2b, the carpet 100 comprises a plurality of waveguides 30. Light source light 42 (not depicted) is coupled into the waveguides 30, such as optical fibres. Again, in-coupling of the light source light 42 of light source 40 in the waveguide may in an embodiment be enabled by optics, like collimators, etc. The arrangement of the optical fibres 30 is a regular arrangement. The waveguides 30 each comprise a plurality of waveguide light out-coupling sites 31, thereby allowing a substantial homogeneous generation of carpet light 102 (not depicted in this drawing).

Note that light source 40, though drawn as single light source (in this and other drawings), may for instance comprise a plurality of light sources, such as LEDs. For instance, the light source 40 may comprise RGB LEDs, as described above.

FIG. 2c schematically depicts an embodiment of carpet 100, substantially being the same as the embodiment schematically depicted in FIG. 2b, but having a plurality of light sources 40, wherein here each light source 40 is arranged to couple light source light 42 (not depicted) into a plurality of waveguides 30. By way of illustration, a voltage source 80 is depicted, arranged to supply power to the light source(s) via electric wire(s) 81.

In other embodiments there may be one waveguide 30 for each one light source 40. Hence, in an embodiment, the waveguide 30 comprises a plurality of waveguides, and the light source 40 comprises a plurality of light sources, wherein each waveguide and each light source, respectively, are arranged to couple light source light of the light sources, into the waveguides, respectively.

Note that although FIGS. 1a-1c and 1f-1h are schematically depicted as having the light source 40 external, and FIGS. 1d and 1e are schematically drawn without light source 40, those schematically depicted embodiments may alternatively (or optionally additionally) comprise an internal light source 40, i.e. a light source 40 which is arranged between the primary backing layer 10 bottom face 132 and the carpet bottom layer 142.

Figure 3:
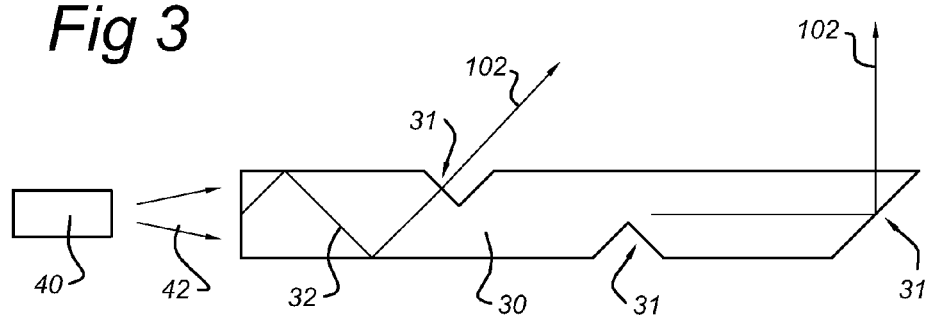
FIG. 3 schematically depicts a non-limiting number of embodiments of light out-coupling sites in a waveguide.

Finally, FIG. 3 schematically depicts an embodiment of waveguide 30, such as an optical fibre, having a plurality of light out-coupling sites 31, such as recesses and a reflective (end) face.

Further, with respect to the secondary backing layer 20, in an embodiment this secondary backing layer 20 may be based upon an existing product for the secondary backing layer, such as the one known under the name ActionBac®. This is a backing made of a leno weave of slit film and spun olefin yarns. It has a 2.1 ounce per square yard (0.71 gram per square meter) fabric with polypropylene warp tapes and polypropylene multifilament picks in a leno wave with averages of 16 warps per inch (per 2.54 cm) and 5 picks per inch (per 2.54 cm). Such a backing layer imparts dimensional stability with good delamination strength in carpets. This backing layer also has openness well suited for robust curing rates during manufacture. The air permeability of this backing, determined according to ASTM D-737 with a pressure differential equal to 0.5 inch water, exceeds about 750 ft3/min/ft$^2$ (229 m$^3$/min/m$^2$), which is ample for robust binder cure rates. Another such product with a higher count, 18×13, leno wave construction, has average air permeability above about 720 ft$^3$/min/ft$^2$ (219 m$^3$/min/m$^2$). This is also well suited for efficient cure rates. Preferably, the secondary backing layer 20 has a high adhesive compatibility with the material used for the adhesive layer 50, so that the carpet 100 will pass delamination test such as the test described in ASTM D-3936. The delamination resistance-imparting properties should preferably be such that the backing when laminated in the reference carpets described has a delamination strength of at least 2.5 pounds/in (44.6 kg/m). However, preferred values are greater than 3-4 pounds/in (53.6-71.4 kg/m), more preferably at least 5.5 pounds/in (98.2 kg/m) and even more preferably at least 6 pounds/in (107.1 kg/m).

To prevent delamination good bonding is required. Bonding may be improved by having sufficient openness not to impede passage of vaporized binders liquids from the carpet during curing.

Air permeability of the secondary backing can be determined according to ASTM standard D-737, with a pressure differential equal to 0.5 inch water (see also above). An acceptable value is 250 ft$^3$/min/ft$^2$, but more preferred values are in the range of 350-800 ft$^3$/min/ft$^2$. As an example, secondary backings with below about 70 ft$^3$/min/ft$^2$ are considered to be inadequate for high binder cure rates. As an example, ActionBac® is a very suitable secondary backing and exceeds 750 ft$^3$/min/ft$^2$.

As can be seen in the figures, part of the secondary backing may be covered with the waveguide(s) and optionally the light source(s). If the base secondary backing has a sufficiently high air permeability this is acceptable. For example, if 50% of the surface is covered, the air permeability is in the worst case reduced to 50% of the normal air permeability. In order to achieve an acceptable air permeability of 250 ft$^3$/min/ft$^2$, one should therefore use a secondary backing with an air permeability of greater than 500 ft$^3$/min/ft$^2$. As an example, ActionBac® has an air permeability of greater than 700 ft$^3$/min/ft$^2$ and therefore may be used for the current invention.

It should be noted that any other existing secondary backing material may be used as basis for the secondary backing layer 20 used in this invention. Other examples are needlefelt backings, rubber backings, PVC backings, polyurethane backings, vinyl backings, cushion backings, nylon backings. The fibres in the needlefelt backings are needled for bonding. It is also noted that a cushion or padding may be integrated in the secondary backing. Another example of a secondary backing material is bitumen. This material is used when extra sturdy carpet is required, such as for example in carpet tiles, or in car mats. In some embodiments bitumen may also be used as adhesive. As mentioned above, preferably such secondary backing layer 20 is comprised in the tufted carpet 100 according to the invention.

EXAMPLE

In an example, the carpet 100 comprises an ActionBac® secondary backing 20, and an open loop tufted primary backing 10. A pure latex is used without any filler material as adhesive layer 50. Between the primary 10 and secondary backing 20 optical fibres as waveguides 30 are arranged in a random pattern, but the endpoints of the optical fibres are combined in one location, where they exit the carpet and are led towards one halogen light source as light source 40, with an absorbing colour wheel for providing a plurality of light colours. Light source light 42 from the halogen light source 40 is coupled into all optical fibres simultaneously and light 102 is coupled out at the end-points of the optical fibres, which are between the primary and secondary backing.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A light emitting tufted carpet having a carpet top layer and a carpet bottom layer, the light emitting tufted carpet comprising:
 a primary backing layer permeable to light substantially over its entire surface,
 a waveguide-comprising a light out-coupling site integrated within the carpet, and
 wherein the primary backing layer has a primary backing layer carpet face being the carpet top layer and a primary backing layer bottom face,
 wherein the wavequide has substantially the same area as the primary backing layer,
 wherein the primary backing layer is provided with tufts at the primary backing carpet face substantially over its entire surface;
 wherein the light out-coupling site is arranged between the primary backing layer bottom face and the carpet bottom layer, and
 wherein the waveguide is arranged to couple light source light of a light source in as waveguide light, and
 wherein the waveguide is arranged to couple waveguide light out at the waveguide light out-coupling site to provide carpet light.

2. The light emitting tufted carpet according to claim 1, comprising a laminate comprising the primary backing layer, an adhesive layer, and the waveguide.

3. The light emitting tufted carpet according to claim 1, comprising a laminate comprising the primary backing layer, an adhesive layer, the waveguide, and the secondary backing layer.

4. The light emitting tufted carpet according to claim 2, wherein the adhesive layer is free from light scattering particles.

5. The light emitting tufted carpet according to claim 1, further comprising the light source, wherein the light source is arranged between the primary backing layer bottom face and the carpet bottom layer.

6. The light emitting tufted carpet according to claim 1, further comprising the light source, wherein the light source is arranged external from the light emitting tufted carpet.

7. The light emitting tufted carpet according to claim 1, comprising a plurality of waveguides.

8. The light emitting tufted carpet according to claim 7, wherein the light emitting tufted carpet further comprises a plurality of light sources, wherein the waveguides and the light sources are arranged to couple light source light of the light sources into the waveguides as waveguide light, respectively.

9. The light emitting tufted carpet according to claim 1, wherein the waveguide comprises a plurality of waveguide light out-coupling sites.

10. The light emitting tufted carpet according to claim 1, wherein the waveguide has a maximum cross-sectional area in a plane substantially parallel to the primary backing layer, wherein the primary backing layer has a primary backing area, wherein the maximum cross-sectional area of the waveguide is equal to or smaller than about 50% of the primary backing area.

11. A method for the production of the light emitting tufted carpet, the method comprising:
 providing a primary backing layer permeable to light substantially over its entire surface,
 providing an adhesive and a plurality of waveguides comprising a plurality of light out-coupling sites disposed toward a primary backing layer bottom face of the primary backing layer or a secondary backing layer top face of a secondary backing layer, and
 laminating the primary backing layer and the secondary backing layer to each other,
 wherein the plurality of waveguides are integrated within the carpet and have substantially the same area as the primary backing layer;
 wherein the primary backing layer is provided with tufts at the primary backing carpet face substantially over its entire surface;
 wherein the light out-coupling site is arranged between the primary backing layer bottom face and the carpet bottom layer, and
 wherein the waveguide is arranged to couple light source light of a light source in as waveguide light, and
 wherein the waveguide is arranged to couple waveguide light out at the waveguide light out-coupling site to provide carpet light.

12. The light emitting tufted carpet according to claim 1, further comprising a secondary backing layer, wherein the secondary backing layer has a secondary backing layer top face and a secondary backing layer bottom face.

13. The light emitting tufted carpet according to claim 1, further comprising an adhesive layer.

* * * * *